United States Patent
Kasaiezadeh Mahabadi et al.

(10) Patent No.: US 10,040,460 B2
(45) Date of Patent: Aug. 7, 2018

(54) CORNER-BASED LONGITUDINAL SPEED ESTIMATION

(71) Applicant: GM GLOBAL TECHNOLOGY OPERATIONS LLC, Detroit, MI (US)

(72) Inventors: SeyedAlireza Kasaiezadeh Mahabadi, Shelby Township, MI (US); Ehsan Hashemi, Waterloo (CA); Amir Khajepour, Waterloo (CA); Shih-ken Chen, Troy, MI (US); Bakhtiar B. Litkouhi, Washington, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 15/223,817

(22) Filed: Jul. 29, 2016

(65) Prior Publication Data
US 2018/0029603 A1    Feb. 1, 2018

(51) Int. Cl.
*B60W 40/105* (2012.01)
*B60W 30/14* (2006.01)
*B60T 8/172* (2006.01)
*B60W 40/107* (2012.01)
*B60W 40/101* (2012.01)
*B60L 3/10* (2006.01)
(Continued)

(52) U.S. Cl.
CPC ......... *B60W 40/105* (2013.01); *B60T 8/172* (2013.01); *B60W 30/14* (2013.01); *B60W 40/101* (2013.01); *B60W 40/107* (2013.01); *B60L 3/102* (2013.01); *B60L 3/108* (2013.01); *B60T 8/1755* (2013.01); *B60W 40/114* (2013.01); *B60W 2520/28* (2013.01); *G06F 19/00* (2013.01)

(58) Field of Classification Search
CPC ........ B60T 8/1755; B60T 8/171; B60T 8/172; B60T 8/17555; B60T 8/329; B60W 40/114; B60W 10/04; B60W 40/105; B60W 40/107; B60W 40/101; B60W 10/08; B60W 10/184; B60W 30/045; B60W 20/00; B60W 10/119; B60W 30/1846; B60L 3/102; B60L 3/108; B60L 7/26; B60L 15/2009; B60L 15/20; B60K 6/44; B60K 31/00; B60K 6/52; G01P 1/02; G01P 3/443; F16C 41/04
See application file for complete search history.

(56) References Cited

U.S. PATENT DOCUMENTS 5,629,478 A * 5/1997 Nakajima ............. B60C 23/061
340/444
6,498,976 B1 * 12/2002 Ehlbeck ............. B60G 17/0162
701/70
(Continued)

*Primary Examiner* — Behrang Badii

(57) ABSTRACT

A system and method for computationally estimating a directional velocity of a vehicle in real time under different configurations and road conditions for use in vehicle antilock braking, adaptive cruise control, and traction and stability control by correcting measured accelerations with respect to the estimated road angles. A time window is used to provide reliable mapped acceleration for the transient regions and maneuvers on gravel surfaces with high fluctuations in the acceleration measurement. Longitudinal and lateral accelerations are mapped from the vehicle's CG into the tire coordinates using the vehicle's geometry, lateral velocity, yaw rate, and the steering wheel angle to generate system matrices of the combined kinematic-force estimation structure.

7 Claims, 3 Drawing Sheets

(51) Int. Cl.
*B60W 40/114* (2012.01)
*B60T 8/1755* (2006.01)
*G06F 19/00* (2018.01)

(56) References Cited

U.S. PATENT DOCUMENTS

| | | | |
|---|---|---|---|
| 7,233,236 B2* | 6/2007 | Lu | B60G 17/0162 |
| | | | 180/197 |
| 9,296,374 B2* | 3/2016 | Yamakado | B60L 3/102 |
| 9,623,850 B2* | 4/2017 | Yamakado | B60T 8/1755 |
| 2006/0108170 A1* | 5/2006 | Ishikawa | B60T 8/171 |
| | | | 180/282 |
| 2009/0102145 A1* | 4/2009 | Moriki | B60K 6/44 |
| | | | 280/5.507 |
| 2012/0143443 A1* | 6/2012 | Lewis | A61G 5/042 |
| | | | 701/42 |
| 2012/0179349 A1* | 7/2012 | Yamakado | B60T 8/1755 |
| | | | 701/89 |
| 2014/0145498 A1* | 5/2014 | Yamakado | B60T 8/1755 |
| | | | 303/3 |
| 2015/0239442 A1* | 8/2015 | Yamakado | B60L 3/102 |
| | | | 701/70 |
| 2016/0244038 A1* | 8/2016 | Yamakado | B60L 3/102 |
| 2017/0305416 A1* | 10/2017 | Yamakado | B60W 30/045 |

* cited by examiner

CORNER-BASED LONGITUDINAL SPEED ESTIMATION

INTRODUCTION

Field of the Invention

The present invention generally relates to a system and method for estimating longitudinal velocity of an object. More particular, the invention relates to a system and method for computationally estimating longitudinal velocity of a vehicle in real time under different configurations and road conditions for use in vehicle antilock braking, adaptive cruise control, and traction and stability control.

BACKGROUND INFORMATION

Accurate vehicle velocity estimation is crucial for reliable performance of the vehicle's traction and stability control systems. Longitudinal velocity and lateral velocity are vehicle dynamic variables used by vehicle control systems. Longitudinal speed is a vehicle dynamic variable used for example by adaptive cruise control systems and antilock braking systems. Lateral velocity is a vehicle dynamic variable used for stability control systems. Longitudinal and lateral velocity are generally estimated via wheel speed sensors, and/or lateral acceleration sensors, and/or other inertia-based sensors. Often such sensors must be calibrated for sensor bias or the use of sensors having high accuracy must be utilized.

Many available longitudinal velocity estimation methods rely on vehicle planar kinematics to develop observers that use standard measurements from an inertial measurement unit (IMU) such as acceleration, yaw, pitch and roll rates without implementing a tire model. These methods may result in estimation errors, large oscillations and drift for high-slip conditions, and low performance for the combined-slip maneuvers because of not using a bounded and stable tire force model. Other methods utilize a tire model in the velocity estimation which also may be inaccurate as a result of unknown road friction and dependency to the tire parameters.

Tire forces can be measured at each corner, but their cost impact, calibration and maintenance are their major drawbacks to be used for production vehicles. Provided that the longitudinal tire force calculation needs road friction, even accurate slip ratio information from the GPS will not provide forces at each corner. Hence, it would be desirable to establish a reliable and computationally efficient algorithm, which is robust to road conditions and uncertainties and independent from wheel torques in order to improve the performance of the chassis control and active safety systems. An ideal system would provide a reliable longitudinal speed estimation at each corner and at the center of gravity independent from wheel torques and robust to the road condition for the vehicle's active safety control systems.

SUMMARY OF THE INVENTION

In accordance with an aspect of the present invention, a vehicle control system comprising a sensor for measuring a wheel speed, a processor for determining a first acceleration at a vehicle center of gravity and for estimating a second acceleration at a vehicle corner in response to the first acceleration and the wheel speed and for estimating a third acceleration at the vehicle center of gravity in response to the second acceleration, and a controller for controlling the vehicle in response to the third acceleration.

In accordance with another aspect of the present invention, a method for controlling a vehicle comprising measuring a wheel speed, determining a first acceleration at a first point, estimating a second acceleration at a second point in response to the first acceleration and the wheel speed, estimating a third acceleration at the first point in response to the second acceleration, and generating a control signal in response to the third acceleration.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
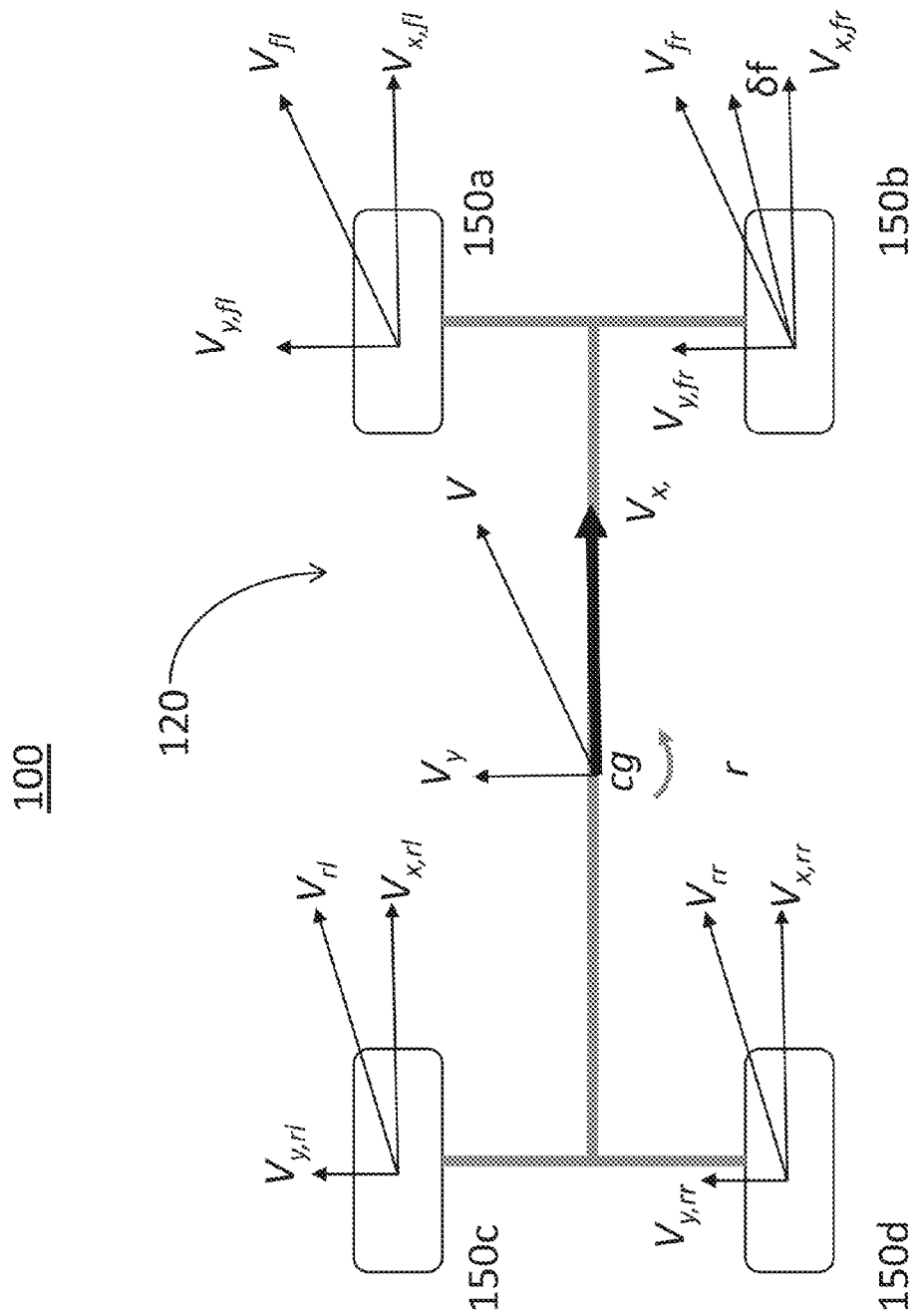
FIG. 1 is a diagram showing an exemplary environment for implementing the present invention.

Referring now to the drawings, and more particularly to FIG. 1, a vehicle 120 experiencing a turning maneuver is illustrated. Longitudinal and lateral velocities at a center of gravity are indicated as vx and vy respectively. A yaw rate is denoted as r and a front steering angle is represented by δf. The center of gravity of the vehicle is denoted by cg. The longitudinal velocities of the four wheels are represented by vx,fl, vx,fr, vx,rl, and vx,rr (front-left, front-right rear-left, and rear-right respectively). Similarly, vy,fl, vy,fr, vy,rl, and vy,rr denote lateral velocities at the four wheels a left front wheel 150a, a front right wheel 150b, a left rear wheel 150c, and a right rear wheel 150d.

Figure 2:
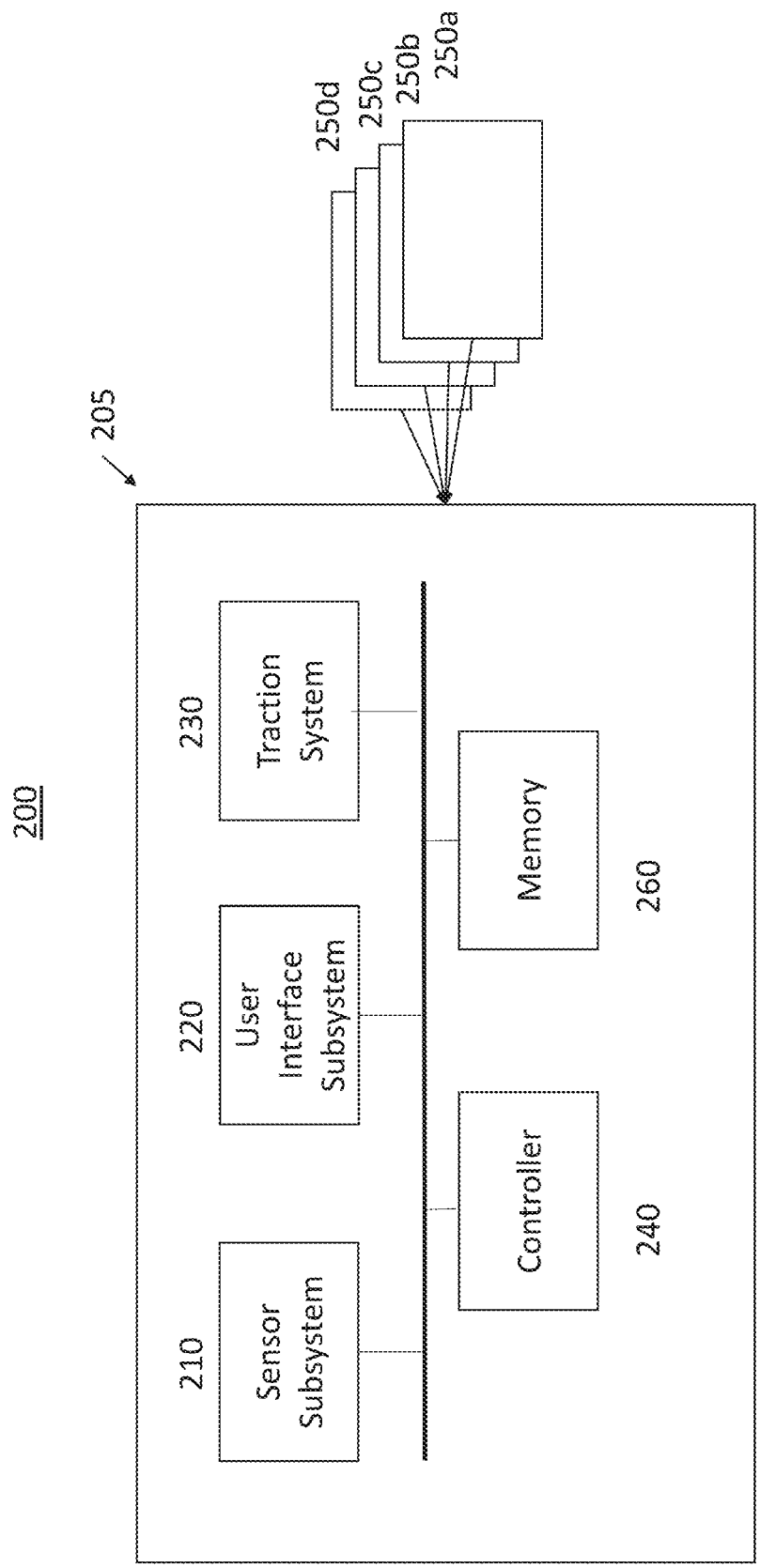
FIG. 2 is a schematic representation of an active vehicle dynamics control system onboard a vehicle according to an exemplary embodiment of the present invention.

Turning now to FIG. 2, a schematic representation 200 of an exemplary embodiment of an active vehicle dynamics control system 205 onboard a vehicle. Generally, a vehicle dynamics control system 205 in a vehicle may be in communication with a global positioning system and/or a plurality of sensors or systems 210 in order communicate signals to a controller 240. Vehicle dynamics control system 205 may include a controller 240 used for receiving information or signals from a number of sensors or systems which may include antilock brake system (ABS) status, a traction control system (TCS) status, positional and sensor data including GPS velocity, yaw rate, wheel speed (at each wheel), lateral acceleration, a steering angle (hand wheel position), longitudinal acceleration from a longitudinal accelerometer, pitch rate and steering angle position. Steering angle position of the steered road wheels. Lateral acceleration, longitudinal acceleration, yaw rate, roll orientation and speed may also be obtained using a global positioning system (GPS). Based upon these signals, controller 240 controls the vehicle dynamics system and may store the signals in an appropriate memory 250. Depending on the desired sensitivity, the type of control system and various other factors, not all of the enumerated signals may be used in a commercial application.

An exemplary vehicle includes four wheels 250*a-d*, each having a respective tire mounted thereto. The vehicle may be a rear-wheel drive vehicle, a front-wheel drive vehicle, an all-wheel drive vehicle, or a vehicle having a selective drive configuration. In addition, the vehicle may also have three wheels, multiple axles and more than four wheels as a matter of design choice and still benefit from the aspects of the present disclosure. Active traction control system 230, which may also referred to as an active corner exiting control system, is an onboard vehicle-based system in that its components are located on, carried by, or integrated into the host vehicle. The active traction control system 230 may include or cooperate with at least the following components or elements, without limitation: a vehicle sensor subsystem 210; a user interface subsystem 220, and an appropriate amount of memory 260. These and other elements of the active vehicle dynamics control system 205 are coupled together in an appropriate manner to accommodate the communication of data, control commands, and signals as needed to support the operation of the system. For the sake of brevity, conventional techniques related to vehicle control systems, vehicle sensor systems, torque management, and other functional aspects of the systems (and the individual operating components of the systems) may not be described in detail herein.

Sensor subsystem 210 is suitably configured to collect real-time (and possibly non-real-time) vehicle status data during operation of vehicle. The active vehicle dynamics control system 205 can process some or all of this vehicle status data in the manner described below, and other subsystems or components might also process or utilize some or all of this vehicle status data. In certain embodiments, sensor subsystem 210 includes sensors (not shown) that collect data indicative of the yaw rate of the vehicle, the lateral acceleration of the vehicle, the velocity of the vehicle, the rotational velocity of the wheels of the vehicle, the wheel slip associated with the wheels of the vehicle, the vertical and longitudinal acceleration, the vehicle pitch, the vehicle roll rate, the wheel position relative to the body of the vehicle, or the like. The design, configuration, and operational details of such vehicle-based sensors will not be described herein because these sensors and their applications are well known to those familiar with the automotive industry.

User interface subsystem 220 is suitably configured as a human-machine interface for vehicle 205 and, in particular, for system 200. User interface subsystem 220 can be realized using one or more elements, features, devices, or components, which may be conventional in nature. For example, user interface subsystem 220 may include, without limitation, any number of: buttons; knobs; switches; levers; dials; keypads; touch screens; touch pads; or the like. To support the active vehicle dynamics control system 205, user interface subsystem 220 may include one or more features or elements configured to receive a user-selected driving condition setting that is indicative of current road conditions, the current road coefficient of friction, a current tire-to-road traction value, or the like. In certain embodiments, user interface subsystem 220 also includes one or more features or elements configured to receive a user-selected vehicle handling setting, which might be indicative of a desired suspension feel, a desired handling limit, or the like.

Corner-based vehicle state estimation is very important for reliable performance of the vehicle's traction and stability control systems. The present system utilizes kinetic calculation with tire models to estimate the relative velocity and the tire internal deflection state at each corner independently using a Kalman filter approach. This developed velocity estimator is robust to road conditions and is insensitive to reasonable changes in tire parameters. This proposed corner-based structure of the longitudinal/lateral force and velocity estimators advantageously leads to better performance of the stability and traction control systems in conditions with different road friction under each tire. The system is operative not to purely rely on the vehicle kinematics. The system is combined with a bounded force state to have reliable estimation in the low-excitation as well as the high-excitation regions at each corner and vehicle's center of gravity (CG). Variable covariance matrices provide a more accurate velocity estimation at each corner for the case of measurement inaccuracies caused by wheel locks, high-slip scenarios etc.

Figure 3:
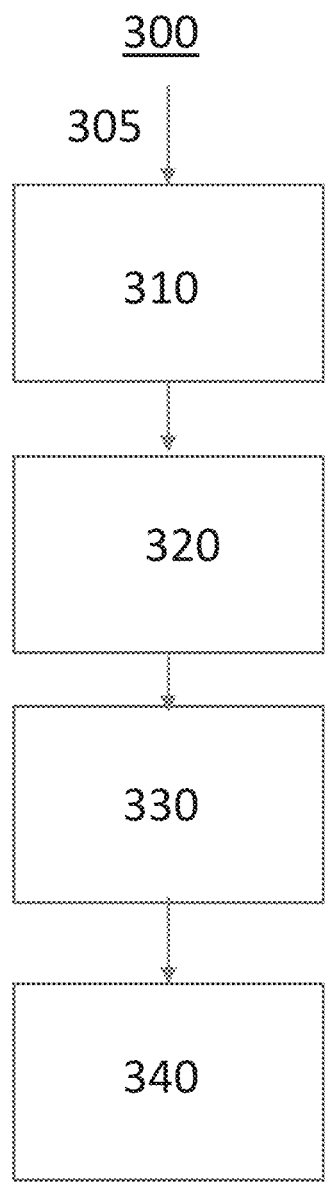
FIG. 3. is a flow diagram of a method for corner-based longitudinal speed estimation according to an exemplary embodiment of the present invention.

Turning now to FIG. 3, a flow diagram 300 of the method of one embodiment for corner-based longitudinal speed estimation is shown. In this exemplary embodiment, the system is operative to receive sensor measurements and estimates including accelerations, wheel speed, yaw rate, and steering wheel angle which are input to the model. At step 310, the system is operative to map the accelerations from the system matrices with kinematic and longitudinal forces. The method may be operational to correct measured accelerations with respect to the road angles. A time window is used to provide mapped acceleration in the tire coordinates for the transient regions and maneuvers on loose surfaces, such as gravel, with high fluctuations in the acceleration measurement. The longitudinal/lateral accelerations are mapped from the vehicle's CG into the tire coordinates using the vehicle's geometry, lateral velocity, yaw rate, and the steering wheel angle. System matrices of the combined kinematic-force estimation structure are generated.

At step 320, the system is operative to estimate longitudinal velocities at each corner using a Kalman-based observer. The vehicle kinematics and a bounded force state are combined to ensure reliable estimation in low and high-excitation regions. Estimation with unscented Kalman filter with augmented states, which is computationally efficient, smooth, and fast. Observation is done on the wheel speed using model forces and adaptive relative velocity. Target relative velocity is calculated based on the acceleration/yaw rate measurement and/or driving conditions. Re-initialization of the covariance matrices are done to avoid accumulated error during the long run and very high-slip scenarios. The time period for re-initialization can change according to the driving condition and the excitation level to avoid unnecessary re-initialization and compromise on accuracy. The excitation level is calculated based on vehicle model response and accelerations.

At step 330, the system is operative to detect a high slip condition at each wheel and perform an adaptive covariance matric allocation. The system detects high-slip condition to allocate adaptive covariance matrices, such as observer gains, for the relative velocity estimation. Sudden changes in the real slip-ratio will not be detected in the case of the large constant high-slip condition threshold. This leads to a greater required time for the estimated slip-ratio to satisfy the threshold which requires larger excitations. On the other hand, small constant threshold results in unnecessary high-slip detection cases. The threshold for the high-slip detection changes according to the driving conditions. This may lead to the prompt and accurate detection and consequently proper covariance matrix allocation. A time window is also utilized to detect high-slip circumstances more reliably, specifically during transient regions. Covariance matrices that resemble observer gains change adaptively based on the high-slip status in order to define the order of reliance on the model or on the wheel speed/force measurement, avoid fluctuations caused by nonlinearities/disturbances during the transient regions of harsh maneuvers, and address the split-µ cases.

At step 340, the system is operative to calculate each of the axle's portion in the longitudinal velocity estimation and mapping these values to the vehicle's CG. Each axle's contribution in the vehicle's longitudinal velocity estimation changes adaptively. Advantages of allocating weights to each axle include avoiding oscillations produced by harsh brake/acceleration, addressing the conditions with different surfaces at each corner, and reliable estimation during large steering at low speed. The contributions adaptively change with smooth functions based on vehicle characteristics, such as two wheel drive or four wheel drive, slip ratio, or relative velocity, at each corner, and steering wheel angle and acceleration measurements related to driving conditions. Inspecting a persistence criterion through a time window is used to remove short-term outliers and avoid incorrect gain allocation; quick excitations and sudden changes of the road friction may generate outliers at each corner. The estimator is then operative to send the longitudinal velocity at each corner to the traction/stability control systems, together with the vehicle's speed.

The present method has the capability of correcting measured accelerations with respect to the estimated road angles. A time window is used to provide reliable mapped acceleration (in the tire coordinates) for the transient regions and maneuvers on gravel surfaces with high fluctuations in the acceleration measurement. The longitudinal/lateral accelerations are mapped from the vehicle's CG into the tire coordinates using the vehicle's geometry, lateral velocity, yaw rate, and the steering wheel angle. System matrices of the combined kinematic-force estimation structure are generated.

What is claimed is:

1. A vehicle control system comprising:
a sensor for measuring a wheel speed;
a processor for determining a first acceleration at a vehicle center of gravity and for estimating a second acceleration at a vehicle corner in response to the first acceleration and the wheel speed and for estimating a third acceleration at the vehicle center of gravity in response to the second acceleration; and
a controller for controlling the vehicle in response to the third acceleration.

2. The vehicle control system of claim 1 wherein the controller is part of an adaptive cruise control system.

3. The vehicle control system of claim 1 wherein the controller is part of an antilock braking system.

4. The vehicle control system of claim 1 wherein the sensor for measuring a wheel speed if further operative to detect a high slip condition of a wheel.

5. The vehicle control system of claim 1 wherein the processor is further operative to determine a high slip condition of a wheel in response to the wheel speed, the processor further operative to apply a time based filtering to the wheel speed in order to determine a corrected wheel speed.

6. The vehicle control system of claim 5 wherein the controller is operative to control the vehicle in response to the corrected wheel speed.

7. The vehicle control system of claim 5 wherein the time based filtering is a Kalman filter.

* * * * *